United States Patent
Lee et al.

(10) Patent No.: US 8,225,142 B2
(45) Date of Patent: Jul. 17, 2012

(54) METHOD AND SYSTEM FOR TRACEPOINT-BASED FAULT DIAGNOSIS AND RECOVERY

(75) Inventors: Kwang Yong Lee, Daejeon (KR); Su-min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 66 days.

(21) Appl. No.: 12/787,086

(22) Filed: May 25, 2010

(65) Prior Publication Data

US 2011/0138224 A1    Jun. 9, 2011

(30) Foreign Application Priority Data

Dec. 9, 2009 (KR) .................. 10-2009-0121774

(51) Int. Cl.
*G06F 11/00* (2006.01)

(52) U.S. Cl. .............. 714/39; 714/37; 714/38.1; 714/45
(58) Field of Classification Search ............... 714/10, 714/26, 37, 38.1, 39, 45
See application file for complete search history.

(56) References Cited

U.S. PATENT DOCUMENTS

| | | | |
|---|---|---|---|
| 6,604,210 B1 * | 8/2003 | Alexander et al. | 714/39 |
| 6,804,814 B1 * | 10/2004 | Ayers et al. | 717/135 |
| 7,882,396 B2 * | 2/2011 | Bolignano et al. | 714/37 |
| 2004/0059966 A1 * | 3/2004 | Chan et al. | 714/48 |
| 2006/0242402 A1 | 10/2006 | Swift et al. | |
| 2006/0248542 A1 | 11/2006 | Wang et al. | |
| 2009/0097397 A1 * | 4/2009 | Moreira Sa de Souza | 370/216 |
| 2009/0138625 A1 | 5/2009 | Lee et al. | |

* cited by examiner

*Primary Examiner* — Robert Beausoliel, Jr.
*Assistant Examiner* — Joseph D Manoskey
(74) *Attorney, Agent, or Firm* — Kile Park Goekjian Reed & McManus PLLC

(57) ABSTRACT

A system for tracepoint-based fault diagnosis and recovery includes: a system state tracing model unit for storing state tracing models which are obtained by a modeling technique and are required for fault diagnosis and recovery; a state diagnosis unit for determining whether or not an action event is executable with reference to the state tracing models when the action event is received from a specific tracepoint among multiple tracepoints which exist in each of components within an operating system of the system, and generating a fault recovery command when it is determined that the action is not executable, that is, a fault has occurred; and a fault recovery unit for performing a fault recovery processing based on the state tracing models in response to the generated fault recovery command.

16 Claims, 5 Drawing Sheets

METHOD AND SYSTEM FOR TRACEPOINT-BASED FAULT DIAGNOSIS AND RECOVERY

CROSS-REFERENCE(S) TO RELATED APPLICATION(S)

The present invention claims priority of Korean Patent Application No. 10-2009-0121774, filed on Dec. 9, 2009, which is incorporated herein by reference.

FIELD OF THE INVENTION

The present invention relates to a technique of diagnosing and recovering a fault that may occur in an embedded system, and more particularly, to a method and system for tracepoint-based fault diagnosis and recovery, which are suitable to diagnose and recover a fault in a system by establishing the system state tracing models using a modeling technique and through questions and answers at tracepoints.

BACKGROUND OF THE INVENTION

As well-known in the art, there is generally a high possibility that a fault (error) may occur in an embedded system for special purpose due to limited resources and characteristics of various devices incorporated therein.

Moreover, when embedded terminals constituting a system related to a traffic, distribution, medical or the like operate in a network-based environment, a fault that cannot be estimated by a developer may occur owing to their increasing complexity. Particularly, a device driver that may have a fatal effect on a system may cause lots of problems.

Therefore, it is general that fault diagnosis and recovery are performed for the components in the embedded operating system, including the device driver. Here, the fault diagnosis is achieved by checking messages and parameters such as a device driver function and a system call function.

Also, a fault isolation technique with relatively high complexity is often employed which uses different memory domains. Besides, by tracking kernel resources used, a technique of preventing a resource leakage when a problem occurs is also employed.

However, the conventional methods have a problem in that there exists a case where they are not suitable for fault diagnosis and recovery due to limited resources and poor environment in the embedded system environment. Especially, the problem of performance overhead caused by the structure with relatively high complexity, such as fault isolation, is generated.

Moreover, the conventional methods provide only fragmentary data-based fault detection, but do not consider coping with faults at action levels of the system.

SUMMARY OF THE INVENTION

In view of the above, the present invention provides a method and system for tracepoint-based fault diagnosis and recovery, which are suitable to diagnose and recover a fault in a system by establishing the system state tracing models using a modeling technique and through questions and answers at tracepoints.

In accordance with an aspect of the present invention, there is provided a system for tracepoint-based fault diagnosis and recovery, including:

a system state tracing model unit for storing state tracing models which are obtained by a modeling technique and are required for fault diagnosis and recovery;

a state diagnosis unit for determining whether or not an action event is executable with reference to the state tracing models when the action event is received from a specific tracepoint among multiple tracepoints which exist in each of components within an operating system of the system, and generating a fault recovery command when it is determined that the action is not executable, that is, a fault has occurred; and a fault recovery unit for performing a fault recovery processing based on the state tracing models in response to the generated fault recovery command.

In accordance with another aspect of the present invention, there is provided a method for tracepoint-based fault diagnosis and recovery, including:

receiving an action event from a specific tracepoint among multiple tracepoints which exist in each of components within an operating system of a system;

determining whether or not the action event is executable with reference to system state tracing models;

transiting a state of the system into a next state when the action event is executable; and performing a fault recovery processing when it is determined that the action is not executable, that is, a fault has occurred.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENT

Unlike the above-described conventional methods which provide the fault isolation technique or fragmentary data-based fault detection, the present invention establishes system state tracing models by a modeling technique, determines whether or not an action event is executable with reference to the system state tracing models when the action is generated from tracepoints, and performs corresponding recovery processing when it is determined that the action event is not executable, that is, a fault (error) has occurred. Thus, the preset invention can effectively solve the problems of the conventional methods through such technical means.

More specifically, the present invention provides a process capable of recovering unknown faults and thus can perform the recovery of unknown faults, as well as well-known faults, depending on a predetermined recovery level, thereby realizing diagnosis and recovery of unknown faults.

Hereinafter, an embodiment of the present invention will be described in detail with reference to the accompanying drawings which form a part hereof.

Figure 1:
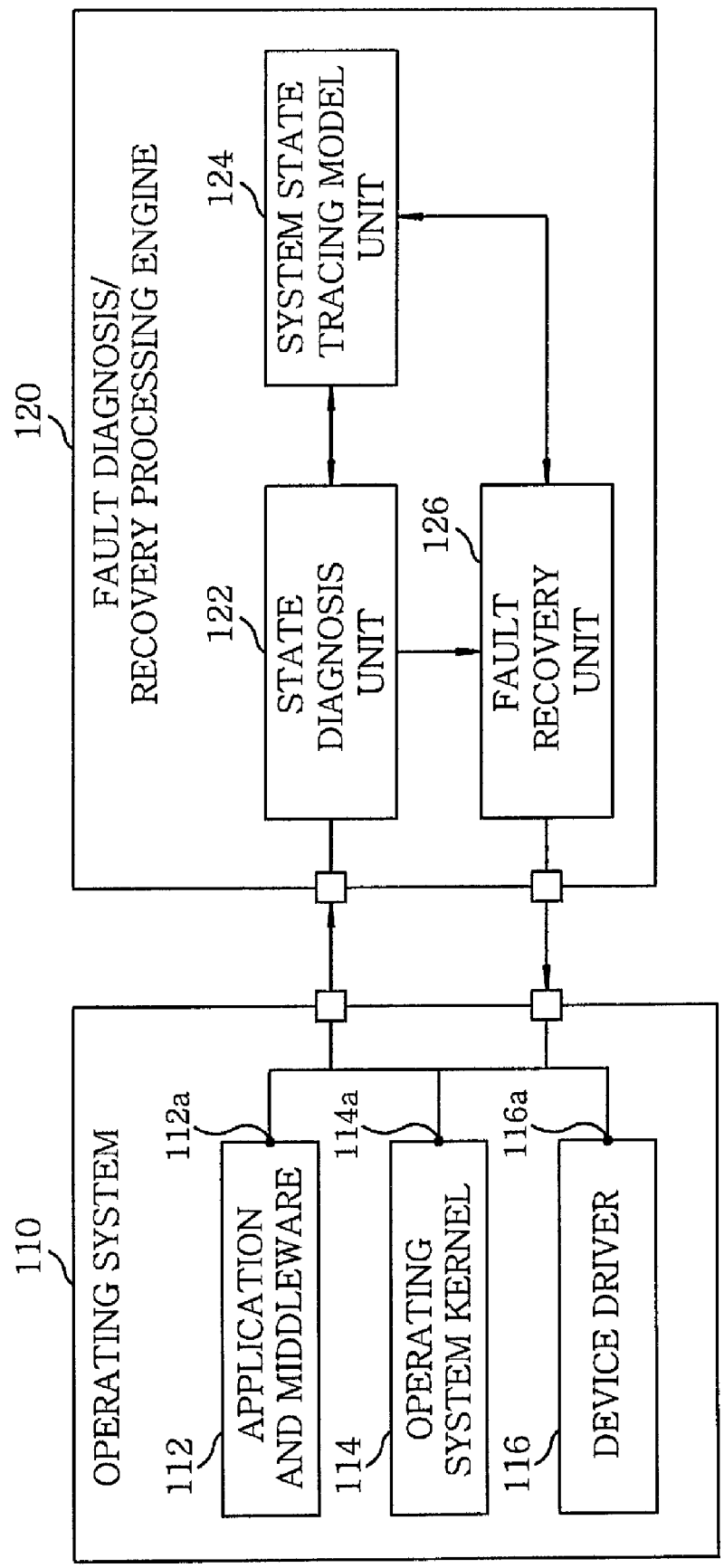
FIG. 1 illustrates a block diagram of a system for tracepoint-based fault diagnosis and recovery in accordance with an embodiment of the present invention.

FIG. 1 illustrates a unit diagram of a system for tracepoint-based fault diagnosis and recovery in accordance with an embodiment of the present invention.

Referring to FIG. 1, the system for tracepoint-based fault diagnosis and recovery largely includes an operating system 110 and a fault diagnosis/recovery processing engine 120. The operating system 110 includes an application and middleware 112, an operating system kernel 114, and a device driver 116. And, the fault diagnosis/recovery processing engine 120 includes a state diagnosis unit 122, a system state tracing model unit 124, and a fault recovery unit 126.

Tracepoints (check points) 112a, 114a, and 116a are set in each component in the operating system 110, i.e., the application and middleware 112, the operating system kernel 114, and the device driver 116, in order to diagnose an action event (that is, in order to diagnose whether its state is correct at a corresponding point of time) when it occurs in a corresponding component.

For instance, when an action event occurs in the application and middleware 112, an inquiry containing the action information is transferred from the tracepoint 112a to the state diagnosis unit 122 in the fault diagnosis/recovery processing engine 120. When an action event occurs in the operating system kernel 114, an inquiry containing the action information is transferred from the tracepoint 114a to the state diagnosis unit 122 in the fault diagnosis/recovery processing engine 120. When an action event occurs in the device driver 116, an inquiry containing the action information is transferred from the tracepoint 116a to the state diagnosis unit 122 in the fault diagnosis/recovery processing engine 120.

The tracepoints, which are set in the respective components, can be classified into a stable group and a risk group depending on the degree of fault probability. A relatively large number of tracepoints can be set in the risk group in comparison with the stable group. Here, the stable group may include, for example, a process management unit, a memory management unit, and the like, and the risk group may include, for example, a file system, a network management unit, a device driver, and the like.

The present invention can set the tracepoints (check points) only at required parts depending on the desired characteristics of the system, thereby improving system overhead and flexibility of performance.

Next, when an action event is received from a specific tracepoint among the tracepoints 112a, 114a, and 116a that exist at the respective components (i.e., the application and middleware 112, the operating system kernel 114, and the device driver 116) within the operating system 110, the state diagnosis unit 122 in the fault diagnosis/recovery processing engine 120 determines whether or not the received action event (current action) is executable with reference to system state tracing models established in the system state tracing model unit 124. If the current action is not included in executable actions, the state diagnosis unit 122 determines that a fault (error) has occurred, and then generates a fault recovery processing command (request) signal to provide it to the fault recovery unit 126 along with the current state information.

To this end, the system state tracing models (i.e., the system state tracing models for diagnosis and recovery of a fault in the system) obtained by modeling are stored in advance in the system state tracing model unit 124. These system state tracing models are selectively provided to the state diagnosis unit 122 and the fault recovery unit 126. That is, only the models that have undergone static verification are used for fault diagnosis, thus improving the reliability of system fault diagnosis.

Next, in response to the fault recovery processing command from the state diagnosis unit 122, the fault recovery unit 126 executes fault recovery by a process that depends on a fault type, based on the corresponding state tracing model provided from the system state tracing model unit 124.

Meanwhile, the faults to be diagnosed can be classified into predetermined (well-known) faults and unknown faults. When the current state of the system is any one of the predetermined faults, the fault recovery unit 126 performs fault recovery based on a corresponding recovery process, and when the current state of the system is one of the unknown faults, the fault recovery unit 126 performs fault recovery based on a predetermined recovery level.

Here, the predetermined (well-known) faults mean faults that can be easily known by a system test for each of the devices in the embedded system, and in the present invention, they mean faults that can be diagnosed at the tracepoints. For example, when LCD resolution is changed by a frame-buffer device driver, that is, the resolution is set to 320×240, rather than 240×320, by the device driver, it is recognized as a fault. Further, when the capacity of the system stack memory exceeds about 2 MB that corresponds to its usable limit, it is also recognized as a fault.

The unknown faults (faults that need a predetermined recovery level) can be further classified into high-risk faults, internal faults, spreading faults, etc. The high-risk faults mean faults that can be solved only by rebooting the system, such as a kernel panic state, etc. The internal faults mean faults that have their spreading effects indirectly on only applications of related device, and that can be recovered only by restarting a corresponding unit. The spreading faults mean faults that are spread to other independent entities (units), that is, faults that are spread to other independent units by structure information existing in a common memory, and can be recovered by restarting a corresponding unit and the main unit.

Figure 2:
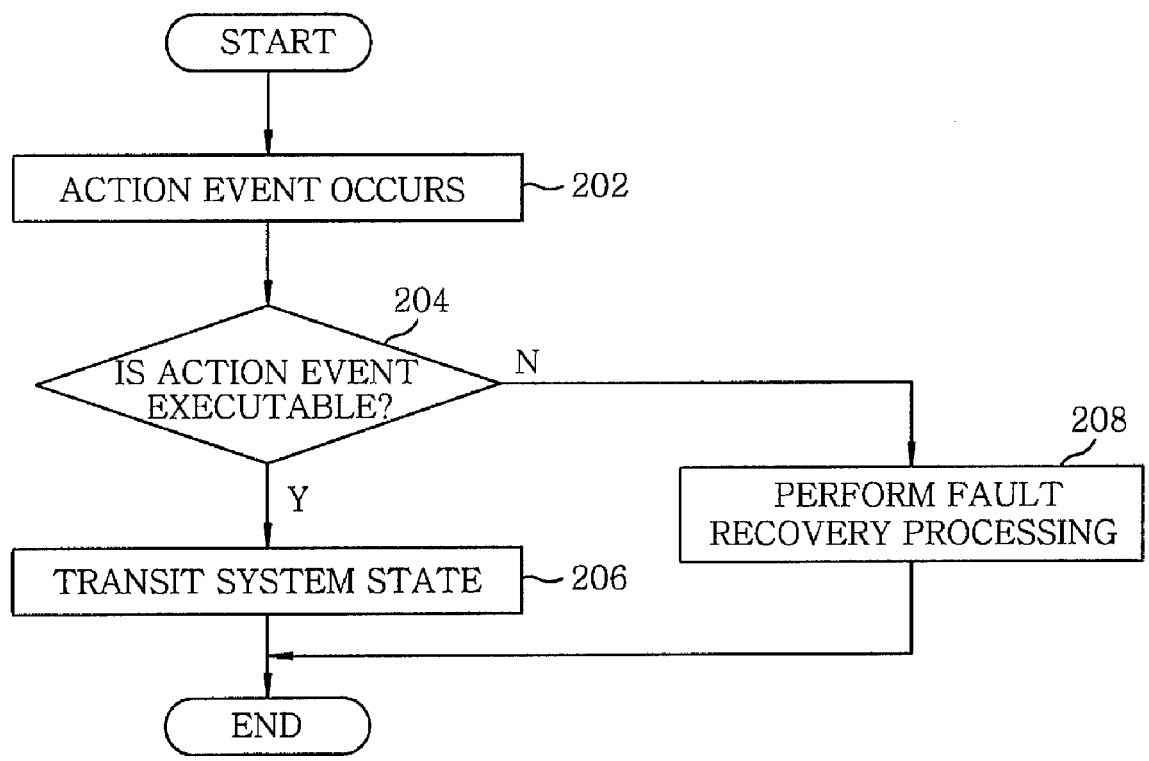
FIG. 2 is a flowchart illustrating a process of executing tracepoint-based fault diagnosis and recovery in accordance with the embodiment of the present invention.

FIG. 2 is a flowchart illustrating a process of executing tracepoint-based fault diagnosis and recovery in accordance with the embodiment of the present invention.

Referring to FIG. 2, in step 202, when an action occurs in a component, i.e., any one of the application and middleware 112, the operating system kernel 114 and the device driver 116, in the operating system 110, an action event (fault diagnosis inquiry) is generated through a corresponding tracepoint and then delivered to the state diagnosis unit 122 in the fault diagnosis/recovery processing engine 120.

Next, upon receipt of the action event from the corresponding tracepoint, the state diagnosis unit 122 determines whether or not the received action event (current action) is executable with reference to the system state tracing models established in the system state tracing model unit 124 in step 204. For this, the state tracing models (i.e., the state tracing models for diagnosis and recovery of a fault in the system) that are obtained by modeling are stored in advance in the system state tracing model unit 124.

As a result of determination in step 204, when the current action is an executable action, a state of the system transits to a next state in step 206.

Meanwhile, when the current action is a non-executable action as a result of determination in step 204, that is, it is determined that a fault has occurred, the state diagnosis unit 122 generates a corresponding fault recovery processing command (request) signal and provides it to the fault recovery unit 126 along with the current state information.

Then, in response to the fault recovery processing command, the fault recovery unit 126 executes a corresponding fault recovery based on the state tracing model provided from the system state tracing unit 124 in step 208. A detailed description of executing fault recovery will be given with reference to FIG. 3.

Figure 3:
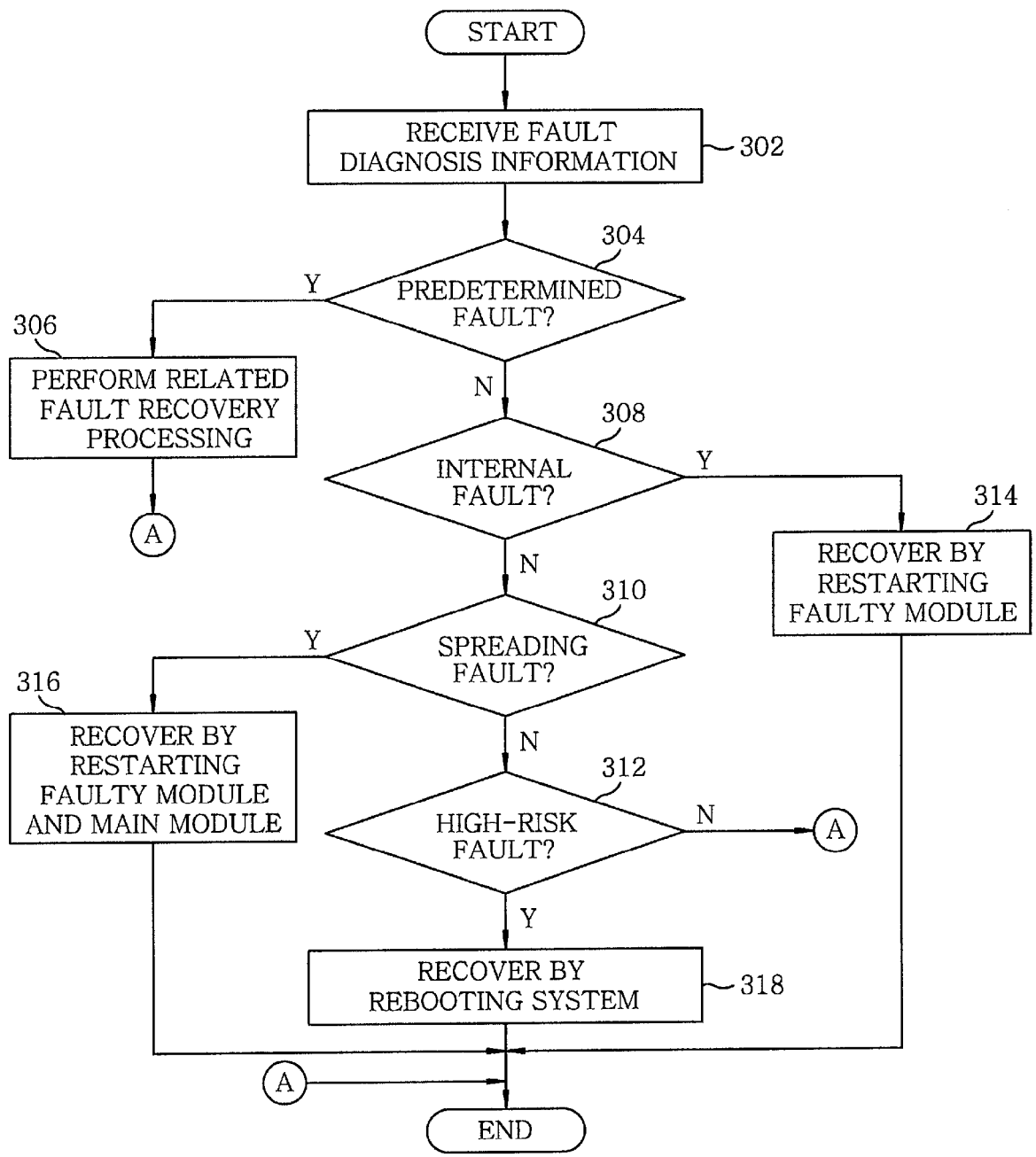
FIG. 3 is a flowchart illustrating a detailed process of the fault recovery execution shown in FIG. 2.

FIG. 3 is a flowchart illustrating a detailed process of the fault recovery execution shown in FIG. 2.

Referring to FIG. 3, when a fault recovery processing command (request) signal is received from the state diagnosis unit 122 in step 302, the fault recovery unit 126 checks if a corresponding fault is a predetermined fault (well-known fault) in step 304.

As a result of checking in step 304, if it is determined that the fault is the predetermined fault, the fault recovery unit 126 performs fault recovery processing based on the state tracing model provided from the system state tracing model unit 124 in step 306.

As a result of checking in step 304, if it is determined that the fault is an unknown fault which is not the predetermined fault, the fault recovery unit 126 checks a type of the fault, that is, checks whether the corresponding fault is an internal fault, a spreading fault, or a high-risk group of fault, to determine a recovery level in steps 308 to 312. If the fault is determined as an internal fault in step 308, the fault recovery unit 126 executes fault recovery by restarting a faulty unit depending on the state tracing model in step 314.

If the fault is determined as a spreading fault in step 310, the fault recovery unit 126 executes fault recovery by restarting a faulty unit and the main unit depending on the state tracing model in step 316.

If the fault is determined as a high-risk fault, the fault recovery unit 126 executes fault recovery by rebooting the system depending on the state tracing model in step 318.

That is, the present invention checks whether a fault is a well-known fault or an unknown fault, and then performs fault recovery based on the checking result. For an unknown fault, the present invention checks a type of the fault and selectively executes fault recovery as required in the current state.

Figure 4:
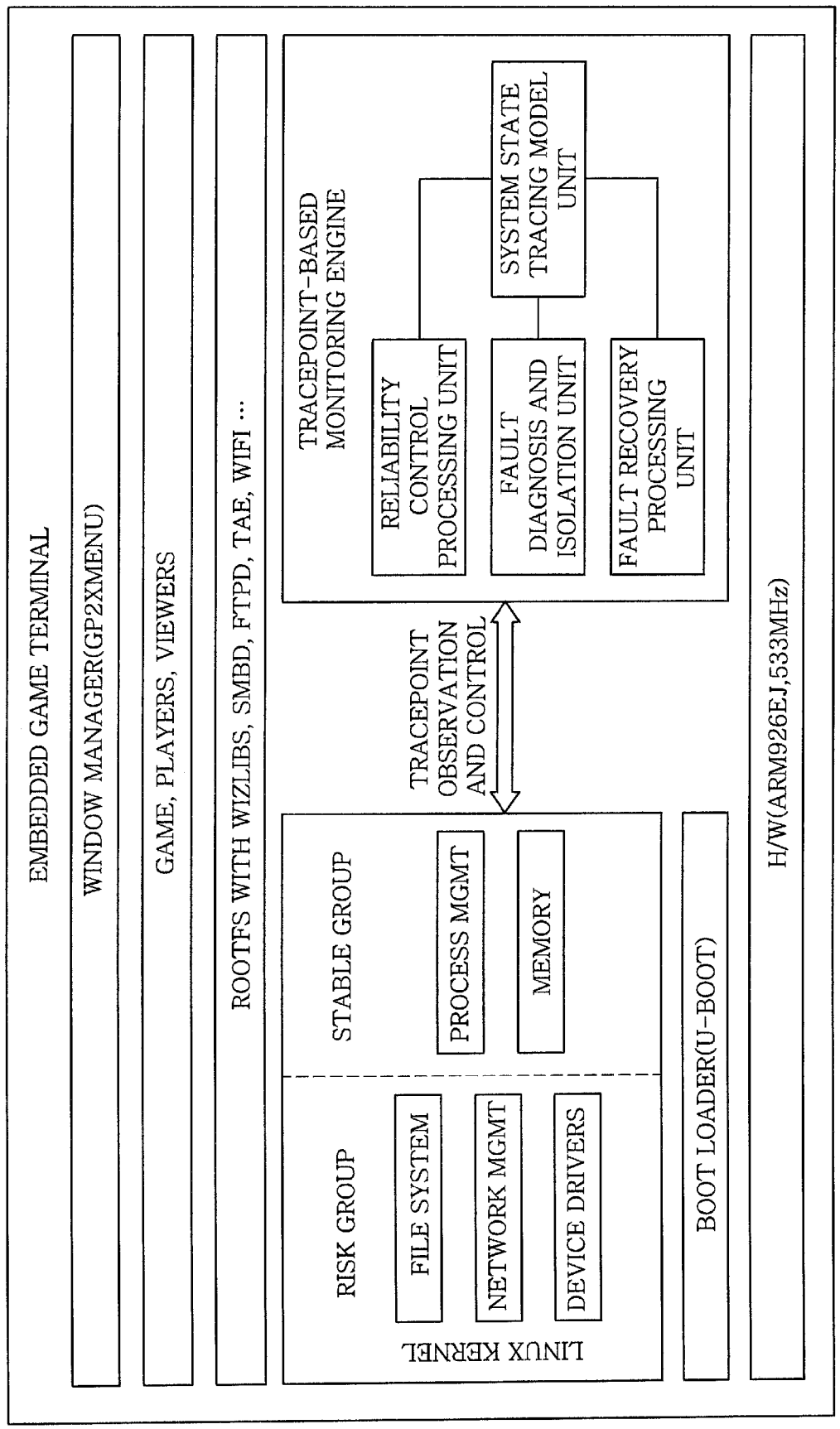
FIG. 4 illustrates an example where the system for tracepoint-based fault diagnosis and recovery in accordance with the present invention is applied to an embedded Linux-based game terminal.

FIG. 4 illustrates an example where the method for tracepoint-based fault diagnosis and recovery in accordance with the present invention is applied to an embedded Linux-based game terminal.

Referring to FIG. 4, Linux-based components are classified into a risk group and a stable group. The stable group includes a process management unit and a memory management unit of which fault probability is relatively low through much verification. The risk group includes a file system, a network management unit, and device drivers of which fault probability is relatively high and stability is not secured. Further, a relatively large number of tracepoints are set in the risk group compared with the stable group.

Meanwhile, a tracepoint-based monitoring engine is composed of a reliability control processing unit, a system state tracing model unit, a fault diagnosis and isolation unit, and a fault recovery processing unit. An application level includes a root file system, and various kinds of application programs and a window manager based on a library and various kinds of demons.

Here, the game terminal employs a frame buffer driver and, upon completion of an arbitrary program, may need rebooting because the window manager is broken unless the resolution of the frame buffer is correctly recovered. The existing method failed to find this fault, while the present invention enables fault recovery by restoring the original resolution through monitoring.

Figure 5:
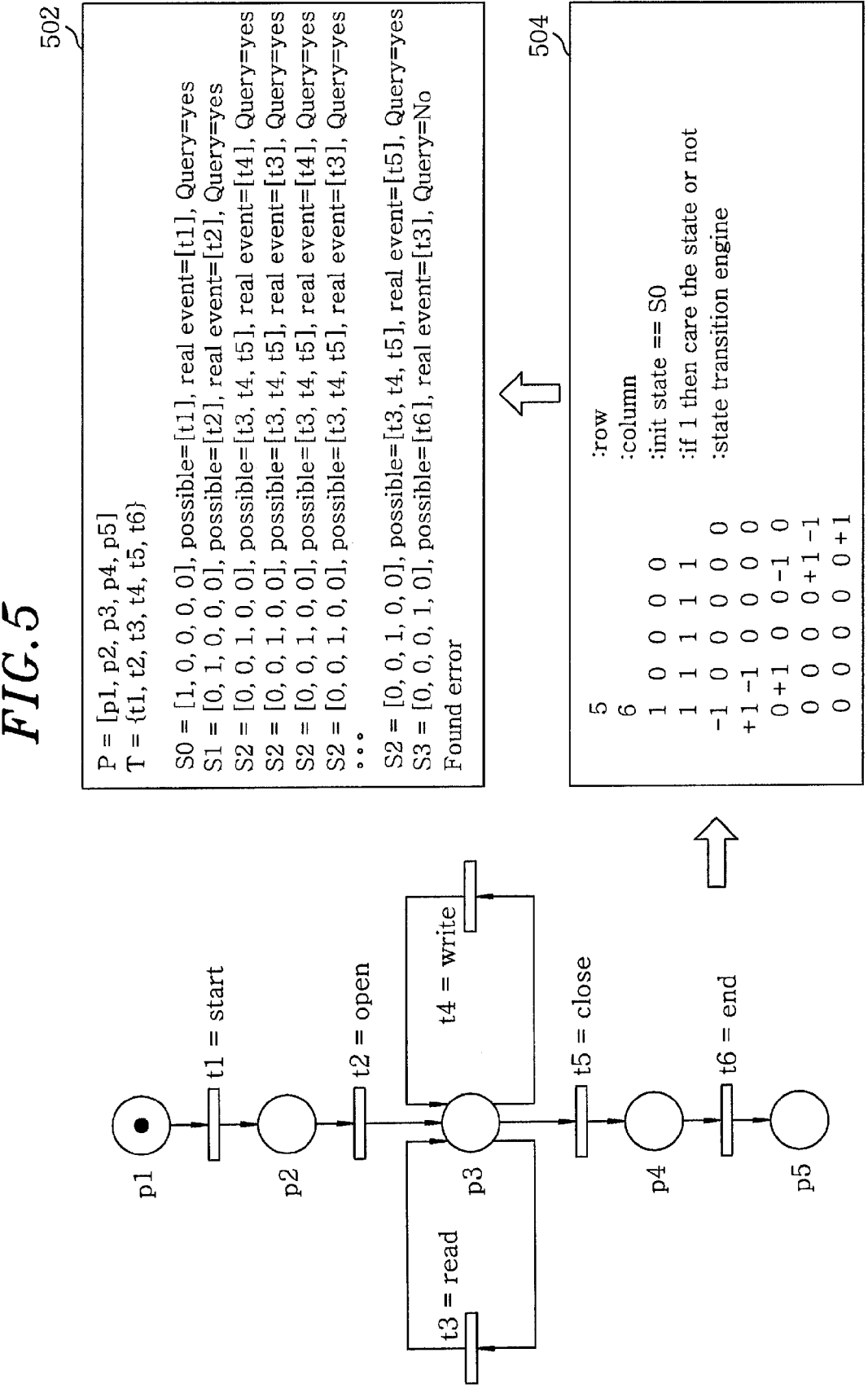
FIG. 5 shows an example of system state modeling in accordance with the present invention.

FIG. 5 illustrates an example of system state modeling in accordance with the present invention, which describes a method for modeling device driver functions and tracing state by petri net modeling.

Referring to FIG. 5, there is shown a petri net model having five places and six transitions for the most basic functions, i.e., open, read, write, and close functions among the device driver functions.

Here, the petri net model starts with the open function and ends with the close function. The read and write functions are flexibly called. In FIG. 5, the lower right table 504 shows how to trace states using data therein.

Further, in table 502, 'possible' denotes a possible event in a current state, 'real event' denotes an event occurred in this example, and 'query' denotes a determination result of a corresponding real event. In S3 in table 502, since 'real event' is not included in 'possible', 'query' becomes no. Thus, it can be seen that a fault (error) has occurred in the system.

As described above, the present invention establishes system state tracing models by a modeling technique, determines whether or not an action event is executable with reference to the system state tracing models when the action is generated from tracepoints, and executes a recovery processing when it is determined that the action event is not executable, that is, a fault has occurred. Thus, it is possible to diagnose a system in the action level of the system and to diagnose and cope with unknown faults.

Further, the present invention can improve the reliability by modeling-based static verification before implementing the system, thereby establishing a fault recovery system optimized for characteristics of various embedded systems.

While the invention has been shown and described with respect to the embodiments, it will be understood by those skilled in the art that various changes and modification may be made without departing from the scope of the invention as defined in the following claims.

What is claimed is:

1. A system for tracepoint-based fault diagnosis and recovery, including a processor and main memory, comprising:
a system state tracing model unit for storing state tracing models which are obtained by a modeling technique and are required for fault diagnosis and recovery;
a state diagnosis unit for determining whether or not an action event is executable with reference to the state tracing models when the action event is received from a specific tracepoint among multiple tracepoints which exist in each of components within an operating system of the system, and generating a fault recovery command when it is determined that the action is not executable, that is, a fault has occurred; and
a fault recovery unit for performing a fault recovery processing based on the state tracing models in response to the generated fault recovery command, wherein the components within the operating system are classified into a stable group and a risk group depending on a degree of fault probability,
wherein the stable group includes any one of a process management unit and a memory management unit.

2. The system of claim 1, wherein the risk group includes at least one of a file system, a network management unit, and a device driver.

3. The system of claim 1, wherein when the action event is any one of predetermined faults, the fault recovery unit performs the fault recovery processing corresponding to the one of the predetermined faults, and when the action event is not one of the predetermined faults, the fault recovery unit performs the fault recovery processing depending on a predetermined recovery level.

4. The system of claim 3, wherein faults that require the predetermined recovery level are classified into a high-risk faults, internal faults, and spreading faults.

5. The system of claim 4, wherein the high-risk faults can be recovered only by rebooting the system.

6. The system of claim 4, wherein the internal faults are faults which have their spreading effects indirectly on applications of related device and can be recovered by restarting a corresponding unit.

7. The system of claim 4, wherein the spreading faults are faults which are spread to other independent entities.

8. The system of claim 7, wherein the spreading faults can be recovered by restarting a corresponding unit and a main unit.

9. A method for tracepoint-based fault diagnosis and recovery, comprising:
 receiving an action event from a specific tracepoint among multiple tracepoints which exist in each of components within an operating system of a system;
 determining whether or not the action event is executable with reference to system state tracing models;
 transiting a state of the system into a next state when the action event is executable; and
 performing a fault recovery processing when it is determined that the action is not executable, that is, a fault has occurred, wherein the components within the operating system are classified into a stable group and a risk group depending on a degree of fault probability,
 wherein the stable group includes any one of a process management unit and a memory management unit.

10. The method of claim 9, wherein the risk group includes at least one of a file system, a network management unit, and a device driver.

11. The method of claim 9, wherein said performing a fault recovery processing includes:
 checking whether or not the action event is any one of predetermined faults;
 performing, when the action event is one of the predetermined faults, the fault recovery processing corresponding to the one of the predetermined faults; and
 performing, when the action event is not one of the predetermined faults, the fault recovery processing depending on a predetermined recovery level.

12. The method of claim 11, wherein faults that require the predetermined recovery level are classified into a high-risk faults, internal faults, and spreading faults.

13. The method of claim 12, wherein the high-risk faults can be recovered only by rebooting the system.

14. The method of claim 12, wherein the internal faults are faults which has their spreading effects indirectly on applications of related device and can be recovered by restarting a corresponding unit.

15. The method of claim 12, wherein the spreading faults are faults which are spread to other independent entities.

16. The method of claim 15, wherein the spreading faults can be recovered by restarting the corresponding unit and a main unit.

\* \* \* \* \*